United States Patent [19]

Cuhel

[11] Patent Number: 4,534,598

[45] Date of Patent: Aug. 13, 1985

[54] HYDRAULIC DISK BRAKE CIRCUIT FOR CRANE DRAW WORKS

[75] Inventor: Leon L. Cuhel, Cedar Rapids, Iowa

[73] Assignee: FMC Corporation, Chicago, Ill.

[21] Appl. No.: 487,639

[22] Filed: Apr. 22, 1983

[51] Int. Cl.[3] .............................................. B60T 13/14

[52] U.S. Cl. .......................................... 303/10; 303/9; 303/85; 303/2

[58] Field of Search ......................... 303/2, 3, 9, 10, 85

[56] References Cited

U.S. PATENT DOCUMENTS

| | | | |
|---|---|---|---|
| 3,003,822 | 10/1961 | McCarthy | 303/85 X |
| 3,672,729 | 6/1972 | Blakey | 303/9 |
| 3,724,609 | 4/1973 | Kobald | 303/9 |
| 3,743,363 | 7/1973 | Hodge et al. | 303/10 X |
| 3,796,467 | 3/1974 | Kito et al. | 303/85 X |
| 3,871,714 | 3/1975 | Behrend | 303/10 |
| 4,003,605 | 1/1977 | Fannin | 303/9 X |
| 4,076,323 | 2/1978 | Kroth | 303/10 X |

*Primary Examiner*—Duane A. Reger

*Attorney, Agent, or Firm*—Ronald C. Kamp; Richard B. Megley

[57] ABSTRACT

An improved system for control of a drum having a disk brake and pawl engageble therewith, including a pressure sensing switch electrically connected with a solenoid valve which is hydraulically connected with a pump and an accumulator teed into the supply from the pump. A solenoid valve, when energized hydraulically connecting a pawl cylinder attached to the pawl with pump pressure and when de-energized directing fluid pressure to apply the brake and dumping the pawl cylinder to reservoir to engage the pawl. Orifice means control the rates of flow to and from the brake and pawl cylinder to avoid shock loads and to assure the drum is stopped before the pawl is engaged.

7 Claims, 1 Drawing Figure

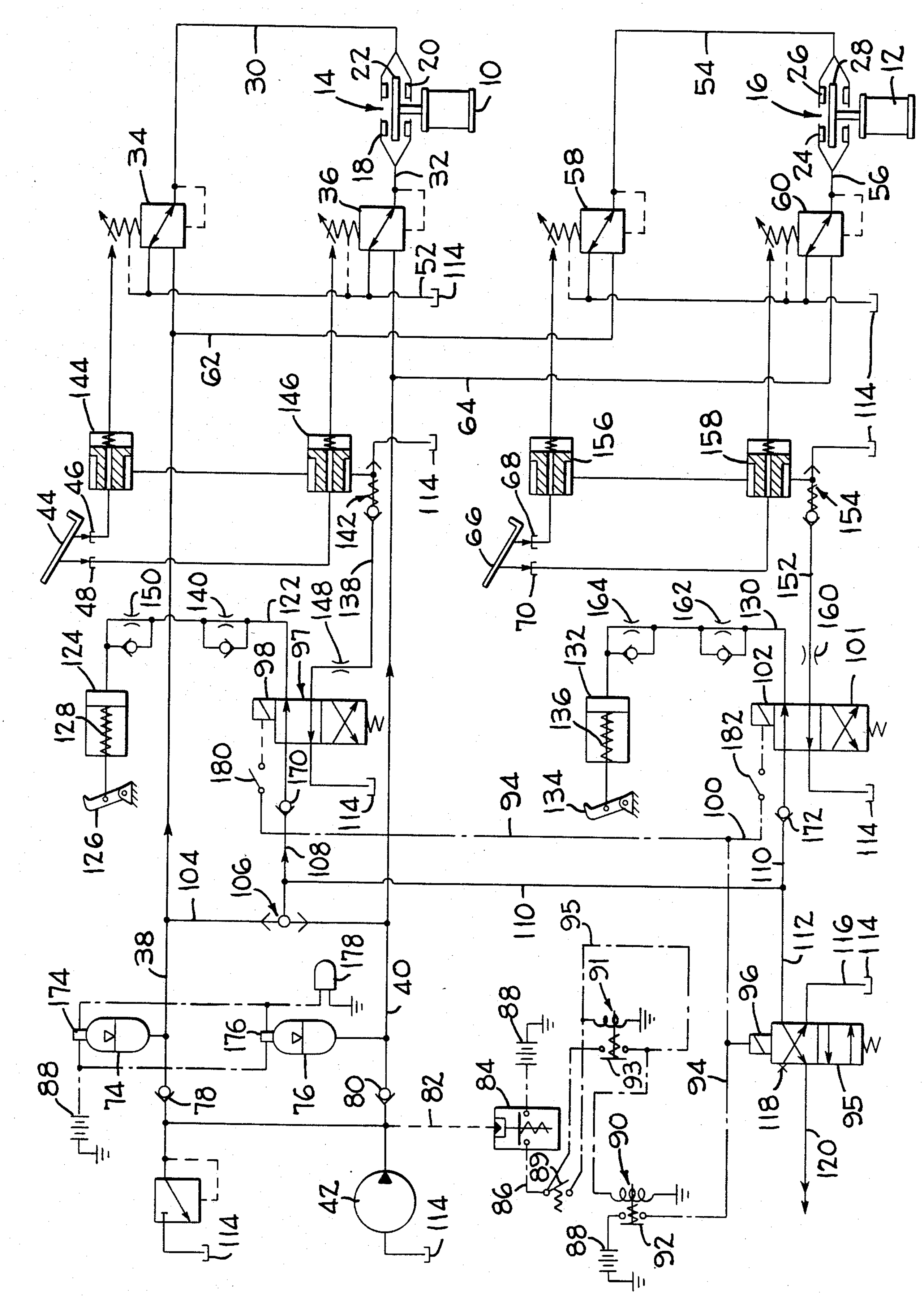
10
12
14
16
18
20
22
24
26
28
30
32
34
36
38
40
42
44
46
48
52
54
56
58
60
62
64
66
68
70
74
76
78
80
82
84
86
88
89
90
91
92
93
94
95
96
97
98
100
101
102
104
106
108
110
112
114
116
118
120
122
124
126
128
130
132
134
136
138
140
142
144
146
148
150
152
154
156
158
160
162
164
170
172
174
176
178
180
182

HYDRAULIC DISK BRAKE CIRCUIT FOR CRANE DRAW WORKS

This invention relates to hydraulic disk brake circuits, and more particularly, to such circuits for the draw works of a mobile crane.

The present invention provides an accumulator teed into a supply line from a pump with a solenoid valve connected to direct accumulator pressure to engage a brake and set a pawl on the drum of a crane when the pump pressure falls. Orifices are provided to assure the brake has fully arrested the drum before the pawl is engaged and to preclude sudden release of the pawl when the pump regains normal operating pressure.

The sole FIGURE of the drawing is a hydraulic and electrical schematic of a preferred embodiment of the present invention.

Referring now to the drawing, the mobile crane has front and rear hoist drums 10 and 12 onto which separate wire ropes are wound and unwound to respectively raise and lower loads attached thereto suspended from the boom of the crane. Disk brakes 14 and 16 are provided to slow the rotation of or stop the drums 10 and 12 respectively. The front disk brake 14 has a pair of calipers 18 and 20 capable of frictionally engaging a rotor 22 attached to the front drum 10. Similarly, the rear disk brake 16 has a pair of calipers 24 and 26 for engaging a rotor 28 attached to the rear drum. The calipers 18 and 20 of the front brake 14 are supplied with fluid pressure for brake engagement through conduits 30 and 32 which connect respectively with variable pressure brake valves 34 and 36. Hydraulic fluid under pressure is supplied to the brake valves 34 and 36 through conduits 38 and 40 respectively from a pump 42 which is driven by an engine on the mobile crane; the pump pressure being modulated or reduced to the calipers 18 and 20 as an inverse function of a control pressure. An operator-controlled foot pedal 44 is connected to similtaneously stroke or displace a pair of spools or pistons 46 and 48 as the pedal is depressed. The hydraulic fluid displaced by the stroking of spools 46 and 48 generates the control pressure. As this pressure increases, the brake valves 34 and 36 reduce the hydraulic fluid pressure returned to the reservoir 50 through conduit 52 and hence increase the pressure directed to the calipers 18 and 20. Each of calipers 18 and 20 has sufficient capacity to restrain or hold the maximum line pull exerted on the wire rope wound on the front drum 10. Thus, either of the calipers 18 or 20 will be independently capable of stopping and holding the maximum anticipated load suspended from the boom and attached to the wire rope on the front drum. A failure of either caliper 18 or 20 and/or its associated hydraulic circuit will permit a controlled restraint of the load on the front drum 10.

The calipers 24 and 26 of the rear disk brake 16 have a similar capacity or load capability. Conduits 54 and 56 separately and independently supply hydraulic fluid pressure to the calipers 24 and 26 respectively and connect with variable pressure brake valves 58 and 60. A supply of hydraulic fluid pressure from the pump 42 is directed to these valves through conduit 62 and 64 which connect respectively with supply conduits 38 and 40. The control pressure to the calipers 24 and 26 is generated by an operator-controlled, footpedal 66 which strokes a pair of spools 68 and 70, in the same manner as pedal 44 and its associated spools 46 and 48.

Nitrogen precharged accumulators 74 and 76 are respectively connected to supply conduits 38 and 40, and are charged with hydraulic fluid by the pump 42. Should pressure from the pump 42 be lost, the charged accumulators will be available to furnish a supply of hydraulic fluid under pressure to the brake valves 34, 36, 58 and 60. A pair of check valves 78 and 80 in the conduits 38 and 40 respectively, upstream of the accumulator 74 and 76 permit flow only toward the accumulators and isolate the pump 42 from the brake circuits upon loss of pressure.

A pilot line 82 senses pump pressure and connects with a pressure actuated electrical switch 84. The switch 84 is normally open and closes at a predetermined pressure to connect conductor or line 86 with an electrical source, such as battery 88. When momentary contact switch 89 is closed, the coil of relay 91 will be energized closing switch 93, which is then held closed by line 95 continuing to energize the coil of relay 91. The coil of relay 90 will thereby be energized closing switch 92. With switch 92 closed, the battery 88 will be connected with line 94, which connects with solenoids 96 and 98, and through a branch line 100, with solenoid 102. When energized, the solenoids 96, 98 and 102 cause their associated valves 95, 97 and 101 respectively to shift to the positions shown in the drawing. The hydraulic conduit 104 extends between conduit 38 and 40 and has a shuttle valve 106 interposed therein. Conduit 108 connects between the shuttle valve 106 and valve 97. The conduit 110 is teed into the conduit 108 and communicates with the valve 101. A branch conduit 112 connects the conduit 110 with the valve 95. The valve 95 connects with the reservoir 114 through conduit 116. A conduit 120 provides power-beyond capability for actuation of other hydraulic equipment utilizing pump flow through conduits 38 and for 40, conduits 108, 110 and 112, valve 95 and conduit 120. The port 118 is blocked so that when solenoid 96 is deenergized, causing the valve 95 to shift upward in response to its spring bias, the conduit 112 will be blocked. Leakage points in the powerbeyond circuit are thereby eliminated and the maximum amount of stored energy will be available from the accumulators 74 and 76 for actuation of the brakes as explained hereinafter.

Pump pressure is also supplied through conduit 108 and valve 97 to conduit 122 which connects with a hydraulic cylinder 124, the rod of which is connected to pawl 126. Pawl 126 is capable of engaging a rachet (not shown) attached to the front drum 10. A compression spring 128 urges the pawl 126 into engagement with the rachet to lock the drum 10 from rotation. Hydraulic pressure extends the cylinder 124, against the bias of spring 128, to disengage pawl 126 from the ratchet. Similarly, pump pressure is supplied through conduits 108 and 110 and valve 101 to conduit 130, which conduit communicates with hydraulic cylinder 132 having a rod connected with a pawl 134 engageable with a rachet attached to the rear drum 12. Spring 136 urges pawl 134 toward engagement with its associated rachet. When pump pressure, as sensed in pilot line 82, drops below a predetermined level, the switch 84 will open deenergizing the relay 91 and opening the switch 93, which in turn will deenergize relay 90 and open switch 92. The solenoids 96, 98 and 102 will be deenergized, permitting the springs of valves 95, 97 and 101 to urge the spools therein upward, as viewed in the drawing. The conduit 112 will be blocked by the shifting of valve 95, sealing or isolating the brake circuit from the other hydraulic circuits. Simultaneously, the valve 97 will connect conduit 108 with conduit 138 and will connect conduit 122 with the reservoir 114. The spring 128 will urge the piston in cylinder 124 to the right, the rate of movement being determined by the orifice 140 which controls the flow of fluid out of the cylinder 124. Fluid pressure from accumulators 74 and 76 will be directed through conduit 108, valve 97 and conduit 138 to a spring biased, shuttle valve 142. The resulting pressure in the shuttle valve 142 will close the drain connection to the reservoir 114 valve 142 and direct pressure to a pair of differential area valves 144 and 146. These valves will shift to the right, as viewed in the drawing, permitting accumulator pressure to be directed to the brake valves 34 and 36 as a control pressure, causing them to admit full accumulator pressure to the calipers 18 and 22. The disk brake 14 will then be applied automatically to gradually slow and stop the drum 10. An orifice 148 in the conduit 138 assures a gradual application of the disk brake, avoiding a shock load on the wire rope associated with the drum 10, as well as on other elements of the crane.

The orifice 140 is sized so that the brake 14 is fully engaged and the drum 10 stopped before the pawl 126 engages the rachet on that drum. A second orifice 150 in conduit 122 controls the rate at which the cylinder 124 is filled so that there is no sudden unexpected release of the pawl 126.

The brake 16 for the rear drum 12, is applied under conditions of pressure loss in a similar way. The shifted valve 101 connects the conduit 110 with a conduit 152 connected with a spring-biased, shuttle valve 154, which directs accumulator pressure to the differential area valves 156 and 158 as a control pressure. These valves shift under this pressure to cause the brake valves 58 and 60 to direct the accumulator pressure to calipers 24 and 26. An orifice 160 assures a smooth application of the disk brake 16. The shifted valve 101 will also connect the conduit 130 with the reservoir 114 permitting the pawl 134 to engage a rachet attached to the drum 12. The orifice 162 assures a predetermined delay before engagement of the pawl 134, while orifice 164 provides the different delay before disengagement of the pawl. Check valves 170 and 172 in conduits 108 and 110 respectively prevent the pawls 126 from assuming a disengaged position until the valves 97 and 101 are shifted by deenergization of their respective solenoids.

A proper nitrogen precharge in at least one of the accumulators 74 and 76 is necessary for operation of the circuit. In order to warn the operator when either of the accumulators does have a proper precharge, a pair of pressure switches 174 and 176, normally closed, are wired in parallel with battery 88 and an alarm device 178. If either of the accumulators 74 and 76 has a low nitrogen precharge, the switch 174 or 176 associated with that accumulator will close activating the alarm and alerting the operator.

When the operators shuts down the crane the loss of pump pressure will permit switch 84 to open, which causes accumulator pressure to apply the brakes and allows the pawls to engage their respective ratchets. Once the relay 91 has been deenergized, the brakes are applied and the pawls engaged. The subsequent closing of switch 84 due to pump pressure appearing in pilot line 82 will not release the brakes and disengage the pawls. The operator must first close switch 89. This requirement minimizes the possibility of inadvertently dropping a load. The operator also can apply the brakes and set the pawls 126 and 134 for either the front and rear drums 10 or 12 by opening the switches 180 and 182, which will individually deenergize the associated solenoid.

It will be seen from the foregoing that the present invention provides a disk brake circuit which will automatically arrest and hold the load on either or both of the front and rear drums, thus obviating the need for quick operator reaction, or even knowledge of a malfunction. Since the present invention utilizies a narrow disk brake, the width of the upper may be minimized, and unlike band brake systems, requires little or no adjustment. Each of the disk brakes are applied by a split system, so that failure of either half of the system will automatically cause the other half of the system to stop the drum and insert the pawl. Suspended or free-falling loads can be brought to a halt regardless of pump failure, a single accumulator failure or a line breakage.

While a preferred embodiment of the present invention has been shown and described herein, it will be appreciated that various changes and modifications may be made therein without departing from the spirit of the invention as defined by the scope of the appended claims.

What is claimed is:

1. In a crane having a hoist drum, a wire rope wound on said drum and capable of raising and lowering a load in response to winding and unwinding said rope, a reservoir and a pump; an improved system for control of the drum comprising:

a fluid supply line connected to the output of said pump;

a disk brake engageable with the drum for frictionally arresting movement of the drum in response to receiving fluid under pressure;

a brake valve for directing fluid pressure from the pump to said brake;

a pawl biased toward engagement with the drum to lock the drum from unwinding rotation;

a pawl cylinder connected to said pawl and responsive to fluid pressure to disengage said pawl from said drum;

an accumulator teed into said supply line;

a check valve in said supply line for isolating said pump when accumulator exceeds pump pressure;

a first solenoid valve when energized directing fluid pressure to said pawl cylinder and when de-energized connecting said pawl cylinder to reservoir and directing fluid pressure to said disk brake;

a pressure-sensing electrical switch; and electrical circuit means connecting said switch to said solenoid valve to energize the same when the pressure developed by said pump falls below a predetermined value;

whereby said brake arrests rotation of said drum and said pawl engages said drum to prevent lowering of the load in response to pump pressure falling below said predetermined value.

2. The invention according to claim 1, wherein said electrical circuit means comprises:

a first relay which is connected, when energized, to energize said solenoid valve;

a holding relay connected to energize said first relay; and a momentary contact switch connected, when closed, to energize said holding relay;

whereby closing of said momentary contact switch is necessary to energize said solenoid valve once the pump pressure has fallen below said predetermined value.

3. The invention according to claim 2 and further comprising:

a first orifice between said solenoid valve and said disk brake to control flow of fluid pressure to said disk brake and prevent sudden application of said brake when said solenoid valve is de-energized.

4. The invention according to claim 3 and further comprising:

first parallel check valve and orifice means interposed between said pawl cylinder and solenoid valve for controlling the exhausting of fluid from said pawl cylinder to the reservoir when said solenoid valve is de-energized to assure that rotation of said drum has stopped before engagement of said pawl with said drum.

5. The invention according to claim 4 and further comprising:

second parallel check valve and orifice means interposed between said pawl cylinder and solenoid valve to control the rate of fluid flow into said pawl cylinder to preclude sudden release of said pawl when said solenoid is energized.

6. The invention according to claim 5 and further comprising:

a control switch in series with said electrical circuit means to permit selective application and release of the brake and pawl even if pump pressure remains above said predetermined value.

7. The invention according to claim 6, wherein said pump is connected to supply hydraulic pressure to additional components; and further comprising:

an isolating solenoid electrically connected in parallel with said first solenoid valve and connected hydraulically to isolate said additional components from said accumulator when energized.

* * * * *